United States Patent Office 3,379,534
Patented Apr. 23, 1968

3,379,534
PREPARATION OF A LOW DEXTRIN BEER BY USING AMYLOGLUCOSIDASE
Hersch Gablinger, Basel, Switzerland, assignor to Amylase A.G., Nidwalden, Switzerland, a corporation of Switzerland
No Drawing. Filed Aug. 17, 1965, Ser. No. 480,502
Claims priority, application Switzerland, Aug. 28, 1964, 11,271/64
9 Claims. (Cl. 99—31)

ABSTRACT OF THE DISCLOSURE

A process for preparing a beer which remains clear and substantially free from haze for at least about six months which comprises adding amyloglucosidase to the materials being brewed during the mash and/or fermentation period so as to reduce the amount of dextrins to below a major part of the dextrins which would otherwise remain in the beer, and a beer having from substantially no dextrins to less than a major part of dextrins normally present in beer.

---

This invention is that of a process of producing a beer which, when in bulk or bottles, remains clear and substantially completely free of haze for exceptionally long periods exceeding six months and even a year, whether stored at ambient temperature or under refrigeration. Another part of the invention is the resulting beer which along with that property has a significantly lower content of dextrins and other calories-providing substances in its real extract, in proportion to its alcohol content.

The development of haze in beer, whether from climatic changes or oxidation, is an old and serious problem in the brewing industry. That has been particularly marked since the advent of the pasteurization of beer, for haze develops after a relatively short time with pasteurized beer.

The use of proteolytic enzymes, introduced about fifty years ago, serves to retard haze formation at best for possibly only a few months. Beers made without proteolytic enzymes do not remain clear when chilled to near their freezing point even when freshly packaged.

The problem, however, became more manifest with the increased sale of bottled beer through distributors, with re-sale in cases to the ultimate consumer with resulting increased stocking of bottled beer in cases by the distributors, followed by storage in the home as in the basement and under refrigeration for serving it cold. Shipping of bottled beer over long distances within the country and in the extended export and import trade with the increasing appetite for imported beers has intensified the haze problem still further.

Thus, treatment with proteolytic enzymes to safeguard beer, and particularly bottled beer, against development of haze during the more extended interval between fresh bottling and ultimate consumption under present conditions has been quite inadequate. That is so because at best haze will develop within under three months in beer stored under ambient temperature. Actually, use of proteolytic enzymes cannot be deemed a panacea that will work under all conditions, even for its limited effective time.

The more recent attempts to use absorbents or adsorbents such as bentonite, silica gel, or polyvinyl pyrrolidone, before or during a filtration step in making the beer, has not been any more effective than the use of proteolytic enzymes. Thus, while use of these insoluble agents was recommended as being less expensive than using proteolytic enzymes and less damaging to the beer foam, their use has not found wide acceptance.

Accordingly, there is need for more dependable retarding of haze development even beyond the short periods indicated to be possible with the agents thus far used. Then too, intensification of the problem in the later years by longer shipping distances of beers not locally produced, and also the more extended interval between production and consumption of beer under the distribution practices, sharpens the need for some distinct improvement in steps longer to retard haze development or even prevent it.

Hence, a feature of the invention is its provision of a process that imparts to the resulting beer the property to remain free from haze for periods surprisingly longer than any heretofore possible.

It is another feature of the invention that its process imparts to the beer, and the beer thus has, the property to remain free from haze, whether stored at ambient temperature or under refrigeration even at about 0° C. (i.e. 32° F.), well beyond six months and even as long as a year and more and possibly indefinitely.

A further feature of the invention is the production of a beer containing a little or no dextrins and so having a significantly lower caloric content than beers heretofore made with the same alcohol content.

Yet another feature of the process of the invention is that from a given quantity of starting grains, or extract-bearing materials (e.g. malt, corn, or rice), the resulting beer has a higher alcohol content than that which a beer brewed from the same quantity of those materials would have under the processes heretofore available; or, stated otherwise, the invention enables producing from a smaller quantity of starting extract-bearing materials a beer of a particular alcohol content, to obtain which by the heretofore available brewing conditions would require a significantly larger quantity of the particular starting materials used. The process thus provides considerable savings in raw materials.

Considered broadly, the process of the invention comprises the production of a beer of lower caloric value and significantly extended resistance to haze development over that of heretofore available beers, by incorporating an amyloglucosidase-containing preparation into the extract-bearing materials being brewed and at such a suitable stage in the brewing process to enable the fermentation period, or the mashing period, or both of them, to proceed in the presence of the added amyloglucosidase-containing preparation.

Sufficient of the amyloglucosidase-containing preparation should be used to split the carbohydrates content of the starting amount of extract-bearing material (which splitting occurs also at the 1–6 linkage) and thereby reduce the residual dextrin content possible in the real extract of the finished beer to, say, below about 80 percent, and also to much less, for example, to about 20%, of the dextrins content in the real extract of the heretofore available beers made from the same starting extract-bearing materials without using any amyloglucosidase preparation, and even to still lower than that as well as to no dextrin content. Such beer made without using any amyloglucosidase generally contains between about 1.7 to about 3.1 weight percent of dextrins.

The amount of any specific amyloglucosidase-containing preparation to use varies with its activity as well as with the mashing and/or fermentation conditions, e.g. pH, temperature and time. For example, 20,000 liters of a malt extract of 12 P. (P.=Plato) might require from 100 to 2000 grams of such a preparation depending on its activity, the pH, temperature, and brewing time desired.

The higher the pH, the slower the enzyme action in the mash tub.

The amyloglucosidase appears to act most economically when used only in the fermentation period. However, it is effective also in the mashing period. For a short brewing period, e.g. 7 days, it is advantageous to use the amyloglucosidase in both the mash as well as the fermentation period. The higher the temperature, the more effective the quantity of amyloglucosidase-containing preparation. Obviously, the temperature should be below that at which its activity is destroyed.

Generally, from the known specifications of the starting materials and the planned brewing conditions and time, as well as the determined activity (expressed in units/gram) of the selected amyloglucosidase-containing preparation, a limited number of easy laboratory tests can give a reasonable indication of the quantity of that enzyme preparation to use in the brewing operation.

Obviously, the alpha- and beta-amylases, the enzymes provided by the barley malt used in brewing, cannot provide any of the features of this invention. Otherwise, there would not even have developed the problem which led to the use of the proteolytic enzymes for the limited contribution available from them.

Speaking generally, the product of the invention comprises a beer improved over the type obtainable by the customary brewing methods including mashing and fermentation steps, which improved beer contains from less than about 80% to as little as about 20%, and even to substantially none, of the dextrins otherwise present in the ordinary beer obtainable by said customary methods; and which improved beer also remains clear and resistant to turbidity and haze development for a period of at least about six months and longer even up to and beyond a year.

The amyloglucosidase, also known as glucamylase, advantageously is used in the form of an amyloglucosidase-containing preparation. Such amyloglucosidase-containing preparation is obtainable usually as an enzyme culture filtrate from a fungal source broth. Such amyloglucosidase culture filtrate from *Aspergillus niger* is particularly advantageous. The broth resulting from the fermentation of the *Aspergillus niger* culture generally contains high amyloglucosidase activity. The expression "amyloglucosidase-containing preparation" is used in this specification and the appended claims to embrace any of the useful practical active materials as described herein as well as the effective amyloglucosidase-containing fractions not only of the *Aspergillus niger* culture broth but also of other fungal broth sources as well as of other sources, and also any of such fractions at any state of refinement thereof to enhance its unit effectiveness.

The activity of a particular amyloglucosidase-containing preparation is expressed in amyloglucosidase units. An amyloglucosidase unit is that amount of the particular enzyme-containing material, which will produce one gram of dextrose (i.e. glucose) in 4 hours at 15.6° C. at a pH of 4.3 from an aqueous 6% soluble starch solution.

The method and product of the invention are illustrated by, but not restricted to, the following examples:

Example 1.—Amyloglucosidase use during fermentation period

A mixture of 99 kilos of barley malt and 1500 kilos of corn grits in 4400 liters of water is boiled for 15 minutes. This boiling mixture is added to a mixture of 2310 kilos of barley malt in 7700 liters of water. The temperature of the resulting mash is 65° C. This mash is held at that temperature for an hour, then filtered in a lauter tub, and the residue washed with 12,700 liters of water at 65° C. The fairly clear combined washing and filtrate solution, namely a total of about 23,000 liters of solution, which then is about 12° P. (specific gravity 1.048 at 20° C.) is boiled with 24 kilos of (kiln dry, i.e. 10% water content) hops for 2 hours, strained and cooled to 6° C.

While transferring this cooled wort to the fermentation tank, there is added to it 2200 grams of an amyloglucosidase-containing preparation (having an activity of about 100 amyloglucosidase units per gram) and also 75 kilos of yeast. The wort with these added enzymes is allowed to ferment for a period of 11 days (the time can be varied from 7 to 14 days) during which time the temperature rises to about 10°. The beer mixture then is chilled to between about 2° to 4° C. The yeast is allowed to settle out, and the mixture then is filtered. The filtrate (beer) is carbonated, 2 kilos of the customary (proteolytic) chill-proofing enzyme are admixed, and the beer then is bottled. This beer, whose alcohol content is about 6% by weight, will remain clear for as long as up to a year and possibly longer whether stored at ambient temperatures or at some time held under refrigeration. Bottles of beer from an initial experimental scale lot made by the foregoing procedure with the same materials in the same proportions are still clear in over ten months after bottling.

Example 2.—Same as Example 1 without proteolytic enzyme

The procedure of Example 1 is repeated except that no customary (proteolytic) chill-proofing enzyme is added. Sample bottles of the beer from an initial experimental scale lot made by the identical procedure with the same proportions of the materials, and kept at ambient temperature as well as under refrigeration, still are clear after ten months.

Example 3.—Same as Example 1 with less extract-bearing materials

The procedure of Example 1 was followed except that 66 kilos of malt and 1000 kilos of corn grits in 4400 liters of water were boiled and added to a mash containing 1530 kilos of malt and 7700 liters of water. After filtering and washing the residue, the filtrate solution, namely a total of about 23,000 liters of solution, was 8° P. (spec. grav. 1.032 at 20°). It was boiled with 15 kilos of the hops, strained and cooled to about 6° C. While transferring this cooled wort to the fermentation tank, there was added to it 1450 grams of the amylogluosidase preparation (100 units/gm.) and 55 kilos of yeast. The so treated wort was allowed to ferment for 11 days. After letting the yeast settle out, it was filtered out, and the filtrate beer was bottled. Its alcohol content was 4% by weight. This beer will remain clear beyond nine months and even longer than a year whether set aside at ambient temperature or kept under refrigeration about 0° C. (i.e. 32° F.).

Example 4.—Amyloglucosidase used during mashing and fermentation periods

The procedure used for Example 3 is repeated, except that 300 grams of the amyloglucosidase preparation (100 units/gm.) are added to the mash in the mash tub, 1450 g. of that amyloglucosidase-containing preparation are added also to the strained and cooled wort transferred to the fermentation tank; and the fermentation is allowed to go on. The bottled beer obtained will remain clear beyond nine months and even longer than a year whether set aside at ambient temperature or kept under refrigeration.

The quantity of the specific amyloglucosidase-containing preparation used in any of the specific examples can be replaced by a different amount of the same preparation to provide such change as may be needed for the final specifications of the end product. Similarly, the amount of the amyloglucosidase-containing preparation can be replaced by that amount of any other suitable amyloglucosidase-containing preparation, which will provide the equivalent extent of effectiveness.

The method of the invention is applicable similarly to the production of any other of the different beers, for example, ale, malt liquor, and stout.

It is understood that various modifications and substitutions can be made in any of the specific illustrative examples within the scope of the appended claims.

What is claimed is:

1. In a process for preparing alcoholic beer whose flavor is derived at least in part from the action of yeast on an aqueous extract of barley malt, and which process includes a mashing period followed by a fermentation period, the improvement which comprises adding amyloglucosidase to the materials being brewed, the amyloglucosidase being added in an amount sufficient to split from at least a major part to all of the dextrins which would otherwise remain in the beer without the use of the amyloglucosidase.

2. A process in accordance with claim 1, in which at least eighty percent of the dextrins is split.

3. A process in accordance with claim 1, in which substantially all of the dextrins are split.

4. A process in accordance with claim 1, in which the amyloglucosidase is present with the wort in the fermentation period.

5. A process in accordance with claim 4, in which the amyloglucosidase is present in an amount of at least about 220 units of amyloglucosidase per about 23 liters of 12° Plato filtered wort.

6. A process in accordance with claim 4, in which the amyloglucosidase is present in an amount of at least about 145 units of amyloglucosidase per about 23 liters of 8° Plato filtered wort.

7. A process in accordance with claim 4, in which substantially all of the dextrins are split, and in which the resultant beer has substantially no dextrin, and remains clear and substantially free from haze for at least about six months.

8. An alcoholic beer of the type whose flavor is derived at least in part from the action of yeast on an aqueous extract of barley malt, which beer contains less than about 0.34 weight percent of dextrins and which is free of turbidity and haze when stored at ordinary ambient temperature for a period in excess of six months.

9. A beer in accordance with claim 8, having substantially no dextrins.

References Cited

UNITED STATES PATENTS 2,223,444  12/1940  Distler _____ 99—31 X
3,332,779   7/1967  Krabbe et al. _____ 99—31

OTHER REFERENCES

Dixon, M., et al.: Enzymes, Academic Press Inc., N.Y., 1958, QP601D5ec.3 (pp. 193 and 229–230).

ALVIN E. TANENHOLTZ, *Primary Examiner.*

HYMAN LORD, *Examiner.*

D. M. NAFF, *Assistant Examiner.*